United States Patent
Hsieh

(10) Patent No.: US 9,842,126 B2
(45) Date of Patent: Dec. 12, 2017

(54) AUTOMATIC REPAIR OF CORRUPT HBASES

(71) Applicant: Cloudera, Inc., Palo Alto, CA (US)

(72) Inventor: Jonathan Ming-Cyn Hsieh, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 378 days.

(21) Appl. No.: 13/842,967

(22) Filed: Mar. 15, 2013

(65) Prior Publication Data

US 2013/0282668 A1  Oct. 24, 2013

Related U.S. Application Data

(60) Provisional application No. 61/636,452, filed on Apr. 20, 2012.

(51) Int. Cl.
*G06F 17/00* (2006.01)
*G06F 17/30* (2006.01)

(52) U.S. Cl.
CPC .. *G06F 17/30303* (2013.01); *G06F 17/30067* (2013.01); *G06F 17/30194* (2013.01)

(58) Field of Classification Search
CPC ............... G06Q 30/02; G06F 11/2007; G06F 17/30038; G06F 11/1456; G06F 11/1435
See application file for complete search history.

(56) References Cited

U.S. PATENT DOCUMENTS

| | | |
|---|---|---|
| 5,325,522 A | 6/1994 | Vaughn |
| 5,825,877 A | 10/1998 | Dan et al. |
| 6,542,930 B1 | 4/2003 | Auvenshine |
| 6,553,476 B1 | 4/2003 | Ayaki et al. |
| 6,651,242 B1 | 11/2003 | Hebbagodi et al. |
| 6,678,828 B1 | 1/2004 | Pham et al. |
| 6,687,847 B1 | 2/2004 | Aguilera et al. |
| 6,931,530 B2 | 8/2005 | Pham et al. |
| 7,031,981 B1 | 4/2006 | DeLuca et al. |

(Continued)

OTHER PUBLICATIONS

Exam Report for GB1403929.1, Applicant Cloudera, Inc. dated May, 2014, 6 pages.

(Continued)

*Primary Examiner* — Mohammad S Rostami
*Assistant Examiner* — Courtney Harmon
(74) *Attorney, Agent, or Firm* — Perkins Coie LLP

(57) ABSTRACT

Systems and methods for checking for region consistency and table integrity problems and automatically repairing a corrupted HBase cluster. The methods and systems operate in a diagnostic mode and a diagnostic and repair mode. The methods include fixing table integrity problems, such as backwards table regions, table region holes, table region overlap, and the like to restore table integrity invariant. Once the table integrity has been restored, each row key resolves to exactly one region. The methods further include fixing region inconsistencies, such as bad region assignment, no region present in the meta table, region information not in the Hadoop Distributed File System (HDFS), and the like to restore region consistency invariant. The information in the HDFS is taken as ground truth and any meta table or assignment problems that are inconsistent with the HDFS is deemed wrong and removed.

21 Claims, 11 Drawing Sheets

(56) References Cited

U.S. PATENT DOCUMENTS

| | | |
|---|---|---|
| 7,069,497 B1 | 6/2006 | Desai |
| 7,107,323 B2 | 9/2006 | Hara et al. |
| 7,143,288 B2 | 11/2006 | Pham et al. |
| 7,325,041 B2 | 1/2008 | Hara et al. |
| 7,392,421 B1 | 6/2008 | Bloomstein et al. |
| 7,487,228 B1 | 2/2009 | Preslan et al. |
| 7,496,829 B2 | 2/2009 | Rubin et al. |
| 7,620,698 B2 | 11/2009 | Hara et al. |
| 7,631,034 B1 | 12/2009 | Haustein et al. |
| 7,640,512 B1 | 12/2009 | Appling |
| 7,653,668 B1 | 1/2010 | Shelat et al. |
| 7,685,109 B1 | 3/2010 | Ransil et al. |
| 7,698,321 B2 | 4/2010 | Hackworth |
| 7,734,961 B2 | 6/2010 | Almoustafa et al. |
| 7,818,313 B1 | 10/2010 | Tsimelzon et al. |
| 7,831,991 B1 | 11/2010 | Kiraly |
| 7,937,482 B1 | 5/2011 | Vermeulen et al. |
| 7,970,861 B2 | 6/2011 | Simitci et al. |
| 7,984,043 B1 | 7/2011 | Waas |
| 8,024,560 B1 | 9/2011 | Alten |
| 8,069,267 B2 | 11/2011 | Powers-Boyle et al. |
| 8,108,338 B2 | 1/2012 | Castro et al. |
| 8,108,771 B2 | 1/2012 | Chijiiwa et al. |
| 8,306,919 B2 | 11/2012 | Sakamura et al. |
| 8,311,980 B2 | 11/2012 | Saito et al. |
| 8,468,244 B2 | 6/2013 | Redlich et al. |
| 8,484,716 B1 | 7/2013 | Hodgson et al. |
| 8,631,403 B2 | 1/2014 | Soundararajan et al. |
| 8,655,939 B2 | 2/2014 | Redlich et al. |
| 8,667,267 B1 | 3/2014 | Garcia et al. |
| 8,732,674 B1 | 5/2014 | Agha |
| 8,788,815 B1 | 7/2014 | Garcia et al. |
| 2002/0055989 A1 | 5/2002 | Stringer-Calvert et al. |
| 2002/0073322 A1 | 6/2002 | Park et al. |
| 2002/0138762 A1 | 9/2002 | Horne |
| 2002/0174194 A1 | 11/2002 | Mooney et al. |
| 2003/0051036 A1 | 3/2003 | Wang et al. |
| 2003/0055868 A1 | 3/2003 | Fletcher et al. |
| 2003/0093633 A1 | 5/2003 | Thiesfeld et al. |
| 2004/0003322 A1 | 1/2004 | Collins et al. |
| 2004/0059728 A1 | 3/2004 | Miller et al. |
| 2004/0103166 A1 | 5/2004 | Bae et al. |
| 2004/0172421 A1 | 9/2004 | Saito et al. |
| 2004/0186832 A1 | 9/2004 | Jardin |
| 2005/0044311 A1 | 2/2005 | Lahiri et al. |
| 2005/0071708 A1 | 3/2005 | Bartfai et al. |
| 2005/0091244 A1 | 4/2005 | Marcotte |
| 2005/0138111 A1 | 6/2005 | Aton et al. |
| 2005/0171983 A1 | 8/2005 | Deo et al. |
| 2005/0182749 A1 | 8/2005 | Matsui |
| 2006/0020854 A1 | 1/2006 | Cardona et al. |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2006/0190503 A1* | 8/2006 | Naicken ............ G06F 17/30587 |
| 2006/0224784 A1 | 10/2006 | Nishimoto et al. |
| 2006/0247897 A1 | 11/2006 | Lin |
| 2007/0100913 A1 | 5/2007 | Sumner et al. |
| 2007/0113188 A1 | 5/2007 | Bales et al. |
| 2007/0136442 A1 | 6/2007 | Palma et al. |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0234115 A1 | 10/2007 | Saika |
| 2007/0255943 A1 | 11/2007 | Kern et al. |
| 2007/0282988 A1 | 12/2007 | Bornhoevd et al. |
| 2008/0104579 A1 | 5/2008 | Hartmann |
| 2008/0140630 A1 | 6/2008 | Sato et al. |
| 2008/0168135 A1 | 7/2008 | Redlich et al. |
| 2008/0244307 A1 | 10/2008 | Dasari et al. |
| 2008/0256486 A1 | 10/2008 | Hagiwara |
| 2008/0263006 A1 | 10/2008 | Wolber et al. |
| 2008/0276130 A1 | 11/2008 | Almoustafa et al. |
| 2008/0307181 A1 | 12/2008 | Kuszmaul et al. |
| 2009/0013029 A1 | 1/2009 | Childress et al. |
| 2009/0177697 A1 | 7/2009 | Gao et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0010968 A1 | 1/2010 | Redlich et al. |
| 2010/0070769 A1 | 3/2010 | Shima et al. |
| 2010/0131817 A1 | 5/2010 | Kong et al. |
| 2010/0179855 A1 | 7/2010 | Chen et al. |
| 2010/0198972 A1 | 8/2010 | Umbehocker |
| 2010/0296652 A1 | 11/2010 | Nakayama et al. |
| 2010/0306286 A1 | 12/2010 | Chiu et al. |
| 2010/0325713 A1 | 12/2010 | Kurita et al. |
| 2010/0332373 A1 | 12/2010 | Crabtree et al. |
| 2011/0055578 A1 | 3/2011 | Resch |
| 2011/0078549 A1 | 3/2011 | Thueringer et al. |
| 2011/0119328 A1 | 5/2011 | Simitci et al. |
| 2011/0179160 A1 | 7/2011 | Liu et al. |
| 2011/0228668 A1 | 9/2011 | Pillai et al. |
| 2011/0236873 A1 | 9/2011 | Bowers |
| 2011/0246816 A1 | 10/2011 | Hsieh et al. |
| 2011/0246826 A1 | 10/2011 | Hsieh et al. |
| 2011/0276396 A1 | 11/2011 | Rathod |
| 2011/0276495 A1 | 11/2011 | Varadarajan et al. |
| 2011/0302417 A1 | 12/2011 | Whillock et al. |
| 2011/0307534 A1 | 12/2011 | Peng et al. |
| 2012/0036146 A1 | 2/2012 | Annapragada |
| 2012/0036357 A1 | 2/2012 | Struik |
| 2012/0102072 A1 | 4/2012 | Jia et al. |
| 2012/0130874 A1 | 5/2012 | Mane et al. |
| 2012/0131341 A1 | 5/2012 | Mane et al. |
| 2012/0271860 A1* | 10/2012 | Graham et al. ............... 707/798 |
| 2013/0031240 A1 | 1/2013 | Byzek |
| 2013/0041872 A1 | 2/2013 | Aizman et al. |
| 2013/0054976 A1 | 2/2013 | Brown et al. |
| 2013/0218840 A1* | 8/2013 | Smith .................. G06F 11/1446 707/639 |
| 2013/0304761 A1 | 11/2013 | Redlich et al. |
| 2014/0188841 A1 | 7/2014 | Sun et al. |
| 2014/0195558 A1 | 7/2014 | Murthy et al. |

OTHER PUBLICATIONS

U.S. Appl. No. 13/854,773, filed Apr. 1, 2013, Kirkland et al.

Beomseok Nam et al: "Spatial indexing of distributed multidimensional datasets", Cluster Computing and the GRID, 2005. CCGRID 2005. IEEE International Symposium on Cardiff~Wales, UK May 9-12, 2005, Piscataway, NJ, USA,IEEE, Piscataway, NJ, USA, vol. 2, May 9, 2005, pp. 743-750.

Chapter 25: Distributed Databases ED—; ; Ramez Elmasri; Shamkant B Navathe (eds), Jan. 1, 2011 (Jan. 1, 2011), Fundamentals of Database Systems (Sixth Edition), Addison-Wesley, pp. 877-927.

Cheng, Security Attack Safe Mobil and Cloud-Based One-Time Password Tokens Using Rubbing Encryption Algorithm, ACM, Jun. 2011, pp. 304-336.

Du et al., "A Pairwise Key Predistribution Scheme for Wireless Sensor Networks," ACM, May 2005, vol. 8 Issue 2, pp. 228-258.

European Search Report for European Application No. 14157984.7, dated Jun. 6, 2014, 10 pages.

Kim et al., Design and Implementation of a Private and Public Key Crypto Processor and Its Applicaiton to a Security System, IEEE, Feb. 2004, vol. %0, Issue 1, pp. 214-224.

Ko et al., "A Study of Encryption Algorithm for RFID tag (SEED: 8 Rounds×64 bit block)," IEEE, s008, pp. 672-677.

Kossmann D: "The State of the Art in Distributed Query Processing", ACM Computing Surveys, ACM, New York, NY, us, vol. 32, No. 4, Dec. 1, 2000, pp. 422-469.

Non-Final Office Action for U.S. Appl. No. 13/362,695, dated Apr. 29, 2013, 23 pgs.

Tamer Dzsu et al: "Principles of Distributed Database Systems", Principles of Distributed Database Systems, XX, XX, Jan. 1, 1991 (Jan. 1, 1991), pp. 74-93.

Babaoglu, O., and K. Marzullo, "Consistent global states of distributed systems: Fundamental concepts and mechanisms," *Distributed Systems*, 53 pages, Jan. 1993.

(56) References Cited

OTHER PUBLICATIONS

Corbett et al., "Spanner: Google's Globally Distributed Database," *Transactions on Computer Systems* (*TOCS*), vol. 31, No. 3, 14 pages, Aug. 2013.
Lamport, L., "Time, clocks, and the ordering of events in a distributed system," *Communications of the ACM*, vol. 21, No. 7, pp. 558-565, Jul. 1978.
Stoller, S.D., "Detecting global predicates in distributed systems with clocks," *Distributed Computing*, vol. 13, No. 2, pp. 85-98, Feb. 2000.
Canada Exam Report for application No. 2843459, dated Aug. 5, 2014, 3 pages.

* cited by examiner

Region Consistency Invariants

Table Integrity Invariants

Version: 0.94.2-cdh4.2.0-SNAPSHOT

Number of Tables: 1
Number of live region servers: 5
Number of dead region servers: 0
Master: a1223.halxg.cloudera.com,57000,1359744114086
Number of backup masters: 1
ERROR: Orphan region in HDFS: Unable to load .regioninfo from table
pe-27-63-table in hdfs dir
hdfs://a1222.halxg.cloudera.com:56020/hbase-cdh4.2/pe-27-63-table/924ceac1e0c337acf21d393173002cdb!
It may be an invalid format or version file. Treating as an orphaned
regiondir.
hdfs://a1222.halxg.cloudera.com:56020/hbase-cdh4.2/pe-27-63-table/924ceac1e0c337acf21d393173002cdb
hdfs://a1222.halxg.cloudera.com:56020/hbase-cdh4.2/pe-27-63-table/924ceac1e0c337acf21d393173002cdb/.splits
ERROR: Unable to read .tableinfo from
hdfs://a1222.halxg.cloudera.com:56020/hbase-cdh4.2/pe-27-63-table
Number of empty REGIONINFO_QUALIFIER rows in .META.: 0
ERROR: Region { meta =>
pe-27-63-table,0003276484,1359721403007.0127c8cbe0f791811192b1f0a7d50a96.,
hdfs => hdfs://a1222.halxg.cloudera.com:56020/hbase-cdh4.2/pe-27-63-table/0127c8cbe0f791811192b1f0a7d50a96,
deployed => } not deployed on any region server.
ERROR: Region { meta => null, hdfs => null, deployed =>
a1223.halxg.cloudera.com,57020,1359626712061;pe-3-81-table,0004843263,1359707717257.057de2ccb7dd264be468580f5dbdcb55.
}, key=057de2ccb7dd264be468580f5dbdcb55, not on HDFS or in META but
deployed on a1223.halxg.cloudera.com,57020,1359626712061
ERROR: Region { meta =>
pe-27-63-table,0003119855,1359721403007.7db29032d83bc5aec693d569623051d6b.,
hdfs => hdfs://a1222.halxg.cloudera.com:56020/hbase-cdh4.2/pe-27-63-table/7db29032d83bc5aec693d569623051d6b,
deployed => } not deployed on any region server.

*FIG. 7A*

ERROR: Region { meta => null, hdfs => null, deployed =>
a1223.halxg.cloudera.com,57020,1359626712061,1359626712061;pe-3-81-table,0004529952,1359698055226.8bd03e499a82172d3472ce203cd54aa0.
}, key=8bd03e499a82172d3472ce203cd54aa0, not on HDFS or in META but
deployed on a1223.halxg.cloudera.com,57020,1359626712061
ERROR: Region { meta => null, hdfs => null, deployed =>
10.20.188.125,57020,1359626727685;pe-3-81-table,0001868711,1359627317065.f455cd4ea21827d5e6937d555d0bfc27.
}, key=f455cd4ea21827d5e6937d555d0bfc27, not on HDFS or in META but
deployed on 10.20.188.125,57020,1359626727685
ERROR: No regioninfo in Meta or HDFS. { meta => null, hdfs => null,
deployed => a1223.halxg.cloudera.com,57020,1359626712061;pe-3-81-
table,0004843263,1359707717257.057de2ccb7dd264be468580f5dbdcb55.
}
ERROR: No regioninfo in Meta or HDFS. { meta => null, hdfs => null,
deployed => a1223.halxg.cloudera.com,57020,1359626712061;pe-3-81-
table,0004529952,1359698055226.8bd03e499a82172d3472ce203cd54aa0.
}
ERROR: No regioninfo in Meta or HDFS. { meta => null, hdfs => null,
deployed => 10.20.188.125,57020,1359626727685;pe-3-81-table,0001868711,1359627317065.f455cd4ea21827d5e6937d555d0bfc27.
}
ERROR: Found lingering reference file
hdfs://a1222.halxg.cloudera.com:56020/hbase-cdh4.2/pe-27-63-table/7db29032d83bc5aec693d56923051d6b/info/
39f6ff97e2094028ad1420ab9a95a7c7.924ceac1e0c337acf21d393173002cdb
Summary:
-ROOT- is okay.
  Number of regions: 1
  Deployed on: 10.20.188.125,57020,1359626727685
.META. is okay.
  Number of regions: 1
  Deployed on: a1222.halxg.cloudera.com,57020,1359736061079
TestTable is okay.
  Number of regions: 26
  Deployed on: 10.20.188.125,57020,1359626727685
a1222.halxg.cloudera.com,57020,1359736061079
a1223.halxg.cloudera.com,57020,1359626712061
a1226.halxg.cloudera.com,57020,1359722144880
8 inconsistencies detected.
Status: INCONSISTENT

*FIG. 7B*

AUTOMATIC REPAIR OF CORRUPT HBASES

CROSS-REFERENCE TO RELATED APPLICATION(S)

The present application claims priority to and benefit from U.S. Provisional Patent Application Ser. No. 61/636,452 titled "Automatic Repair of Corrupt HBases", filed on Apr. 20, 2012, the content of which is incorporated by reference herein.

BACKGROUND

Apache Hadoop project (hereinafter "Hadoop") is an open-source software framework for developing software for reliable, scalable and distributed processing of large data sets across clusters of commodity machines. Hadoop includes a distributed file system, known as Hadoop Distributed File System (HDFS). HDFS links together the file systems on local nodes to form a unified file system that spans the entire Hadoop cluster. Apache HBase (hereinafter "HBase") is a project built on Hadoop. HBase is a scalable, distributed, NoSQL (Not-Only Structured Query Language) datastore that supports structured data storage for large tables.

HBase is usually run on multiple machines or cluster. Sometimes unexpected problems can occur which can corrupt the HBase and lead to down time and data loss. The problems can arise from risks within the cluster, outside the cluster or from users. Repairs for these potentially disastrous situations usually require time-consuming manual analysis and expert knowledge of HBase's internals.

BRIEF DESCRIPTION OF THE DRAWINGS

FIGS. 7A-B depict example reports from a diagnostic scan of HBase cluster.

DETAILED DESCRIPTION

Figure 1:
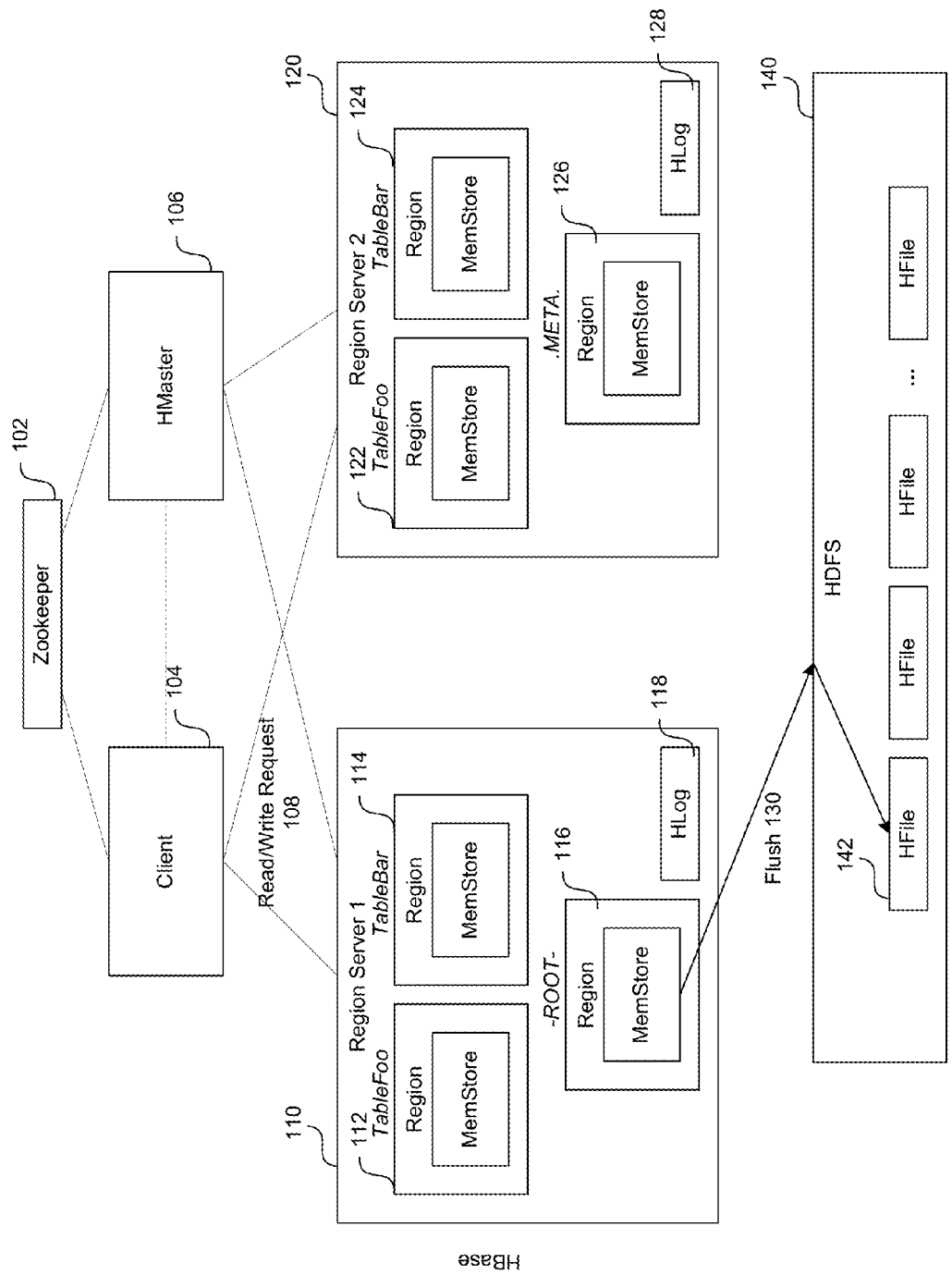
FIG. 1 depicts an example HBase architecture.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for checking for region consistency and table integrity problems and automatically repairing a corrupted HBase cluster. The methods and systems operate in two modes—a read-only inconsistency identifying mode and a multi-phase read-write repair mode. The methods include fixing table integrity problems, such as backwards table regions, table region holes, table region overlap, and the like. Once the table integrity has been restored, each row key resolves to exactly one region. The methods further include fixing region inconsistencies, such as bad region assignment, no region present in the meta table, region information not in the Hadoop Distributed File System (HDFS), and the like. The information in the HDFS is taken as ground truth and any meta table or assignment problems that are inconsistent with the HDFS is deemed wrong and removed.

FIG. 1 depicts an example HBase architecture 100 including a Zookeeper 102, a client 104, a master node (HMaster) 106, multiple region servers (e.g., 110 and 120) and a file storage layer such as the HDFS 140 or other file system. The master node (HMaster) 106 is a coordinator responsible for coordinating the slaves. The master node 106 can assign regions to a region server, detect failures of region servers, perform administrative functions, load balance, check the health of the region servers, and the like. The Zookeeper 102 is a separate cluster of nodes that manages the cluster and failovers of master and/or region servers. For example, the Zookeeper 102 communicates with the master node 106 to register the master node 106. The client 104 communicates with the Zookeeper 102 to look up the master 106, find region server addresses, look up root directory, and the like. The client 104 can sometimes directly communicate with the master node 106.

In order to store a very large dataset distributed across many machines comprising the cluster, HBase partitions each table into segments called regions. Each region has a designated "start key" and "stop key," and contains every row where the key falls between the two. This scheme can be compared to primary key-based range partitions in a relational database management system (RDBMS), though datastores such as HBase manage the partitions automatically and transparently. Each region is typically in the order of a few gigabytes in size, so every region server in the HBase cluster is responsible for several hundred regions. As depicted, region server 110 is responsible for regions 112 and 114 of TableFoo and TableBar respectively, while region server 120 is responsible for regions 122 and 124 of TableFoo and TableBar respectively. Read and write requests 108 from the client 104 are routed to the region server currently hosting the target region.

In one implementation, the client 104 contacts the Zookeeper 102 to find a particular row key. The client 104 retrieves the server name or host name that hosts a root table (-ROOT-) from Zookeeper 102. The root table keeps tracks of where the meta table (.META.) is. By querying the server that hosts the root table, the client can determine the server that hosts the meta table. Both of the location of the root table and the meta table are cached and only looked up once. The client can then query the server hosting the meta table to determine the server that has the row the client is looking for. Once the client knows where the target row is, the client can contact the region server hosting the region directly.

Each region has a MemStore, which is a sorted map, per region, comprising all recently written data, and thus acts like an in-memory cache. Once a write request from the client 104 reaches the correct region server, the new data is added to a MemStore of the target region. As memory is a finite resource, the region server carefully accounts memory usage and triggers a flush 130 on a MemStore when the usage has crossed a threshold. The flush 130 writes the data to disk and frees up the memory. In one implementation, data from the MemStore is flushed into HFile 142 that is written to a distributed file system (DFS) such as the Hadoop Distributed File System (HDFS) 140. Data stored in MemStore is stored in volatile memory. If the system fails, the data in the MemStore is lost. To mitigate this risk, HBase saves updates in a log file (HLog or Write Ahead Log) 118, 128 before writing the data to MemStore. If the region server fails, information that was stored in that server's MemStore can be recovered from its log file. When data is being read, in response to a read request 108 from the client 104, for example, the HBase first checks if the requested data is in MemStore and then checks HFiles in the HDFS 140. HBase then returns merged result to the client 104.

Figure 2A:
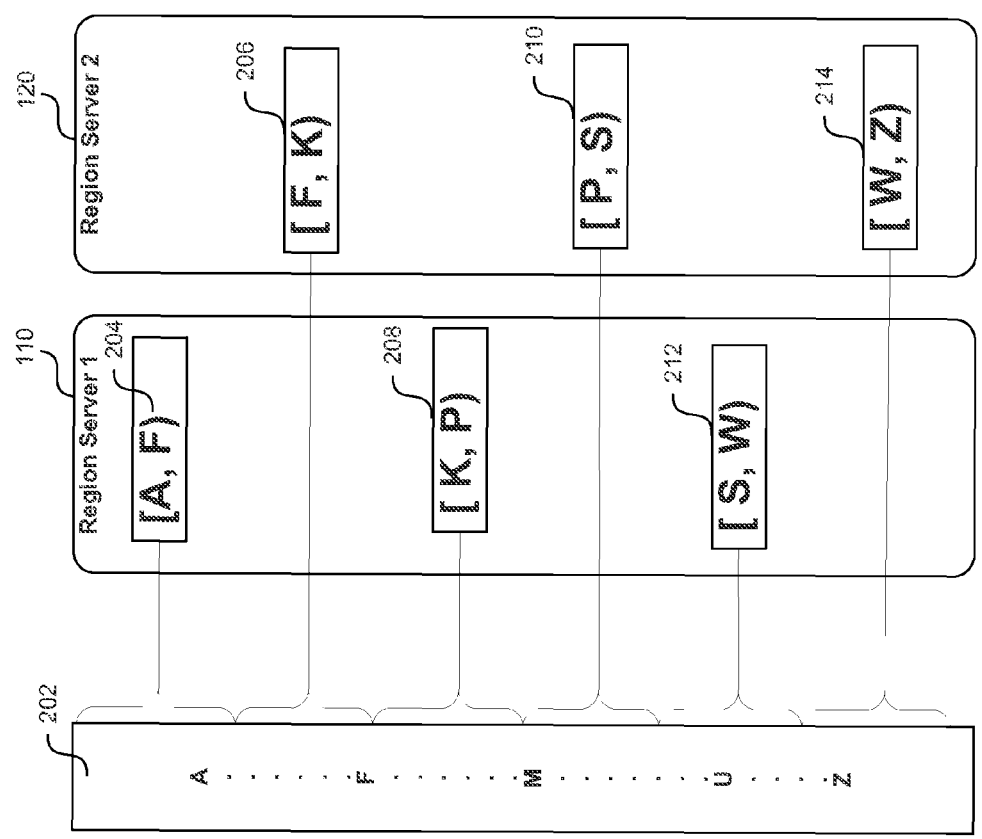
FIG. 2A depicts partitioning of an example table into regions in HBase.

FIG. 2A depicts partitioning of an example table 202 into regions 204-214 in HBase. As depicted, a logical view of the table 202 includes rows A-Z. The regions 204-214 of the table live on the region servers 110 and 120. Each depicted region has a start key and stop key and includes all the rows falling between the two. For example, region 204 includes rows A through F, while region 206 includes row F through K.

Figure 2B:
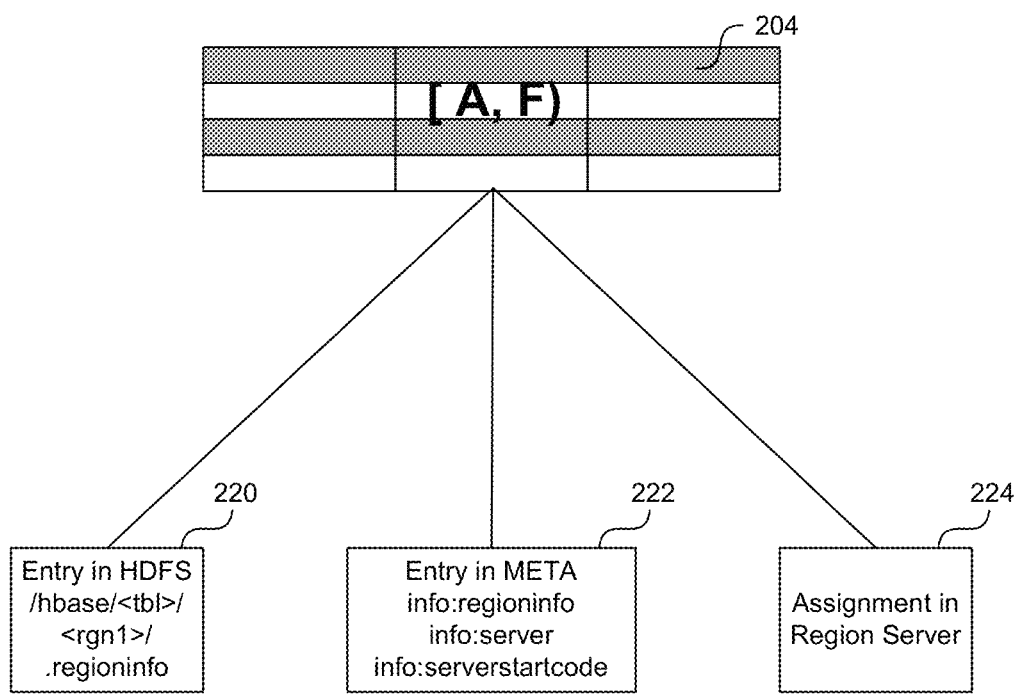
FIG. 2B depicts maintenance of state information in the HBase cluster.

FIG. 2B depicts maintenance of state information in the HBase cluster. Each region has information that is maintained at three different places. For example, region 204 has a corresponding entry 220 in HDFS (.regioninfo), a corresponding entry 222 in meta table and an assignment 224 in a region server (e.g., region server 110).

Figure 2C:
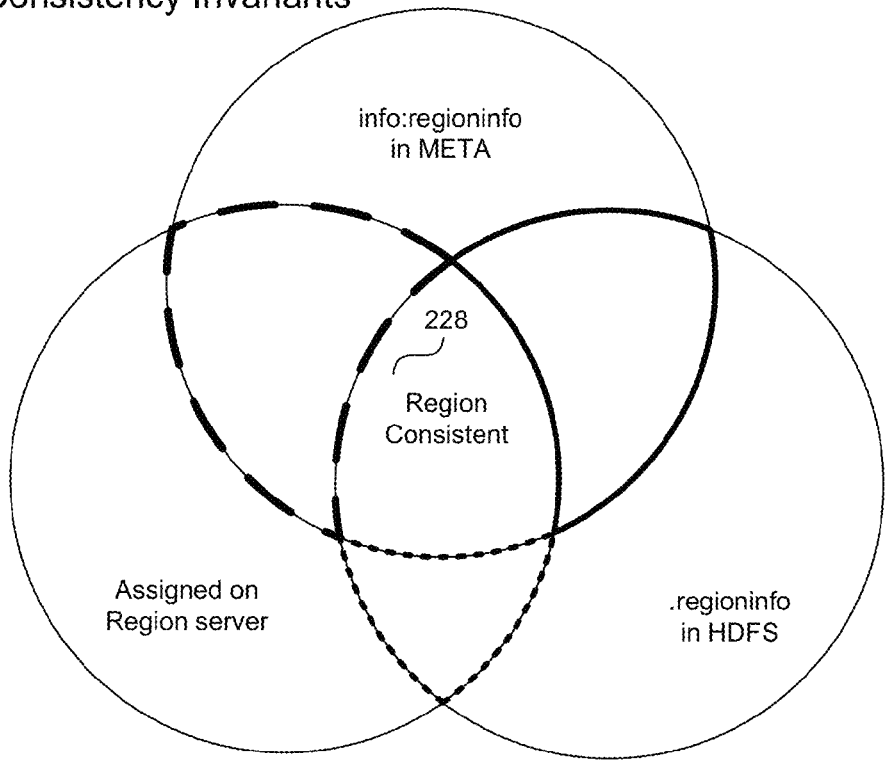
FIG. 2C depicts a diagram illustrating region consistency invariants.
Figure 2D:
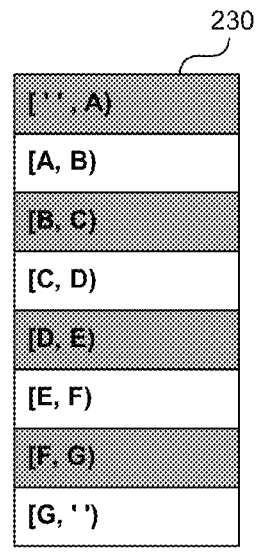
FIG. 2D depicts a diagram illustrating table integrity invariants.

In HBase, there are two invariants which when violated, create inconsistencies. HBase's region consistency invariant is satisfied when every region is assigned and deployed on exactly one region server, and all places where the state is kept are in agreement. HBase's table integrity invariant is satisfied when writing to or reading from a particular table, each row maps to exactly one region. For example, FIG. 2C depicts a diagram illustrating region consistency invariant. As depicted, when region information in the file system, meta table and assignment on region server are in accordance, the region consistent state 228 can exist. In a region consistent state, a read or write request can go through the meta table to determine the correct region server serving the requested data. Similarly, FIG. 2D depicts a diagram illustrating table integrity invariants. As depicted, each row of table 230 is mapped to exactly one key, thereby satisfying the table integrity invariant.

When data corruption occurs due to software bugs, user error, and the like, the integrity and consistency of HBase's internal data is affected, resulting in inconsistencies or errors. In one implementation, HBase diagnostics and repair module or tool scans the internals of HBase, and detects and fixes corruptions, including transient and non-transient corruptions. In another implementation, HBase diagnostics and repair tool provides an accurate and detailed summary of region layout. The tool can check for region consistency and table integrity invariants of a running HBase cluster. For example, the tool can diagnose and repair region consistency problems in meta table, repair overlapping regions, patch region holes and detect and adopt orphan regions.

Figure 3A:
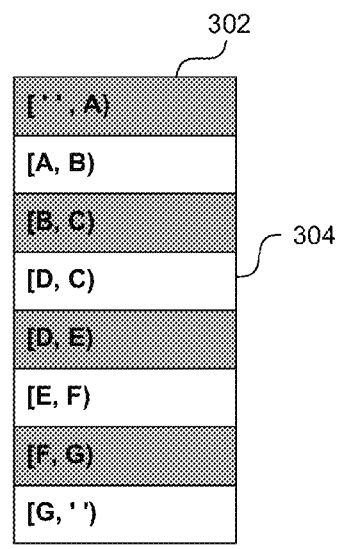
FIGS. 3A-C depict diagrams illustrating restoration of table integrity in HBase.
Figure 3B:
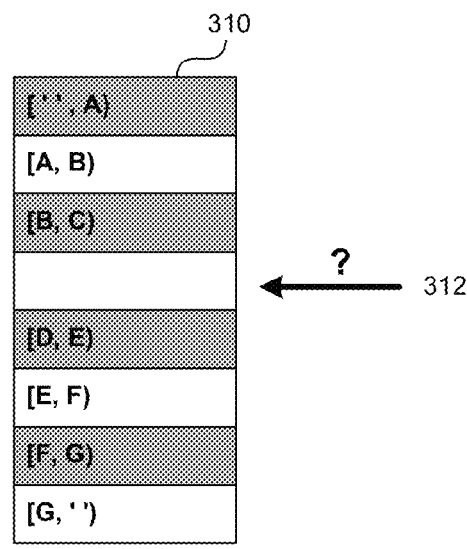
Figure 3C:
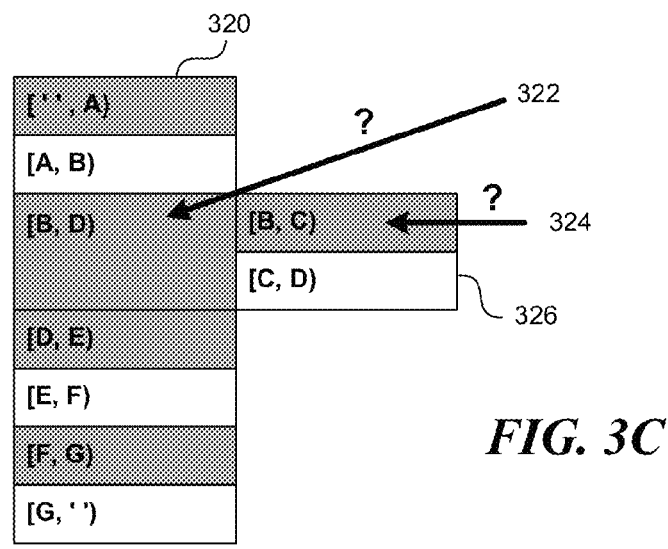

The tool can also diagnose and repair table integrity problems such as degenerate or backwards regions, holes between regions and overlapping regions. FIGS. 3A-C depict diagrams illustrating example table integrity problems in HBase. Referring to FIG. 3A, table 302 has a region 304 that is backwards such that there is no region with a start key C. Referring to FIG. 3B, table 310 has a hole 312, instead of a region [C, D). A client request for data from the region [C, D) would thus fail. Referring to FIG. 3C, table 320 has overlapping regions 322, 324 and 326. A start key of B would then map to both regions 322 and 324, such that the result served to the client may be different each time. These and various other problems and methods for repairing such problems are described in detail below.

Figure 4A:
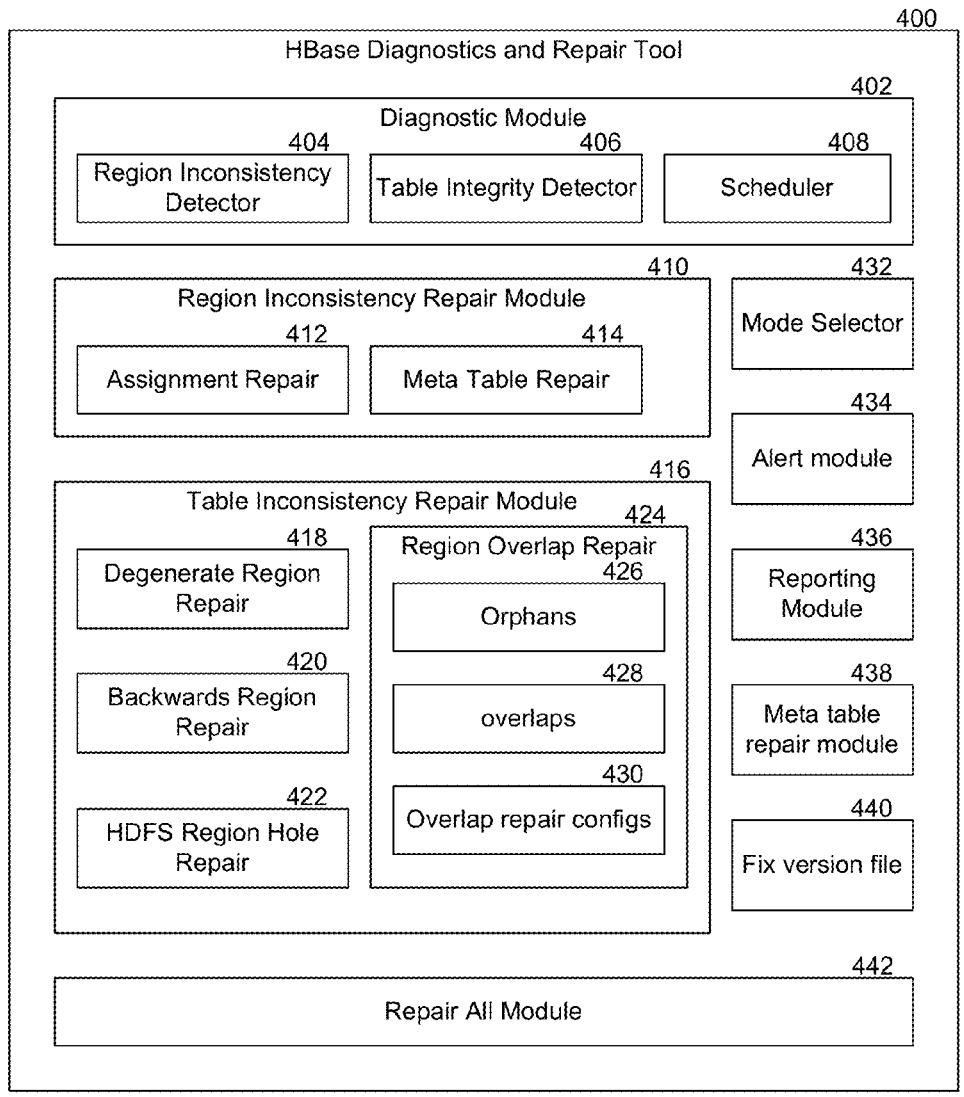
FIG. 4A depicts example components of an HBase diagnostics and repair module or tool.

FIG. 4A depicts example components of HBase diagnostics and repair module or tool 400. The tool 400 can include a diagnostic module 402, a region inconsistency repair module 410, a table inconsistency repair module 416, a mode selector 432, an alert module 434, a reporting module 436, meta table repair module 438, a file version repair module 440 and repair all module 442, among others. One or more of these modules may be consolidated into a single module in some implementations.

The diagnostic module 402 scans the internals of HBase to diagnose problems. In one implementation, the diagnostic module 402 assumes HDFS as the ground truth and any meta table or assignment problems that are inconsistent with HDFS are deemed incorrect. The diagnostic module 402 can include a region inconsistency detector 404, a table integrity detector 406 and a scheduler 408. In one implementation, region consistent state requires fulfillment of three conditions: (1) valid .regioninfo file present in HDFS directory; (2) valid row with .regioninfo data in meta table; and (3) a region deployed only at the region server that it was assigned to. The region inconsistency detector 404 performs region consistency checks to verify that these three conditions are satisfied such that meta table, region deployment on region servers and the state of data in HDFS are all in agreement. When any of the three conditions are not met, inconsistencies can exist. The detector can detect and identify the specific inconsistencies such as assignment inconsistencies (e.g., unassigned regions, incorrectly assigned regions, multiply assigned regions), no region information present in HDFS, no region information in meta table, and the like. In one implementation, the region inconsistency detector 404 may need to connect to and contact the master node and region servers to obtain the information needed for determining whether the region consistency conditions are met.

The table integrity detector 406, in one implementation, verifies whether all possible row keys are resolved to exactly one region of a table. In one implementation, when the integrity of the table cannot be verified, the detector 406 can detect inconsistencies such as degenerate regions, backwards regions (depicted in FIG. 3A), holes between regions (depicted in FIG. 3B), overlapping regions (depicted in FIG. 3C), missing region meta data file, and the like. Besides region inconsistency detector 404 and table integrity detector 406, the diagnostic module 402 may also detect other inconsistencies such as missing version file, corrupt root or meta tables, split region, and the like.

In one embodiment, the scheduler 408 can periodically trigger the diagnostic module 402 to scan the HBase internals to diagnose problems. For example, the scheduler can trigger the diagnostic module to do a scan every 5 minutes, hour, once a day, and the like. Alternately, the diagnostic module can perform the scan on demand, when requested by a user via a client The results of the scan, including any inconsistencies detected may be printed out, displayed or transmitted to a user or saved in a log file by the reporting module 436. An example report, including some of the inconsistencies detected by the diagnostic module 402, is depicted in FIGS. 7A-B.

In one embodiment, the diagnostic module 402 may repeat the scanning and detection process a number of times to verify that the inconsistencies detected are not due to transients (e.g., a write taking place). If the inconsistencies continue to be identified or reported, then corruption of HBase is confirmed. Using the alert module 434, an alert can be generated to inform the user of HBase corruption.

In one embodiment, a region inconsistency repair module 410 and a table inconsistency repair module 416, may include various tools for fixing the problems identified by the diagnostic module 402. The region inconsistency repair module 410, for example, can include an assignment repair module 412 and a meta table repair module 414. The assignment repair module 412 can repair or initiate repair of unassigned, incorrectly assigned or multiply assigned regions by assigning the region to a region server so that a client request for data can be routed to the correct region server, and the requested data can be served. The meta table repair module 414 can repair meta table by removing meta rows when corresponding regions are not present in HDFS and can add new meta rows if the regions are present in HDFS but not in meta table.

In one embodiment, the table inconsistency repair module 416, having various repair modules, can repair inconsistencies to restore the integrity of HBase tables. The degenerate region repair module 418 and backwards region repair module 420, for example, can handle repair of degenerate (where start key=end key) regions and backward regions (where start key>end key) respectively, by sidelining the data to a temporary directory from where data can be restored later to regions mapped to correct row keys.

The HDFS region holes repair module 422 repairs the detected region holes by fabricating new empty regions on the file system, and leverages the region inconsistency repair module 414 to fix the corresponding entry in meta table to add new regions corresponding to the file system and fix assignments to assign the new regions to an appropriate region server such that all three states are in agreement. In other words, when .regioninfo file is missing, a new .regioninfo file may be created in HDFS, and corresponding changes can be made to meta table and assignment to make the three states consistent with each other.

The region overlap repair module 424, in one embodiment, repairs region overlaps that can cause table integrity problems. The region overlap repair module 424 can repair the overlaps by merging the overlapping regions into a larger region or by sidelining the overlapping regions by removing data to a sideline directory from where data could be restored later. The meta table entry and assignment for the region can also be repaired using the region inconsistency repair module 410 to make all three states consistent with each other.

In some instances, there may be data in the file system, but the corresponding entry in meta table may be missing. The data in the file system can be called an "orphan." The region overlap repair module 424 can also adopt orphan region directories that are missing region meta data files (the .regioninfo file). The overlap repair configuration module can be used to configure parameters for the merging or sidelining. For example, a maximum number of overlapping regions for merging can be defined using an option. By way of another example, if more than the maximum number if merge regions are overlapping, sideline option may be used to sideline the regions overlapping with the most other regions. By way of yet another example, if sidelining large overlapping regions, a maximum number of regions to sideline can be defined. In one implementation, the region overlap repair module 424 may provide an option that automatically repairs all region consistency problems and only the hole repairing table integrity problems. In a further implementation, the option may be configured to act on and repair user specified tables.

In one embodiment, the mode selector 432 can configure the operating mode of HBase diagnostic and repair tool 400. In one embodiment, a diagnostic mode, the diagnostic module 402 performs the diagnosing of the health of HBase and detects and identifies any problems with table integrity and region consistency. The diagnostic module then provides a report listing the problems or inconsistencies detected. Any repair action, either online or offline, may then be initiated by the user.

In a diagnostic and repair mode, the diagnostic module 402 performs the diagnosis and identifies the problems as described above. HBase diagnostics and repair tool 400 then automatically, with no user input, selects appropriate repair options to repair the detected problems. For example, if degenerate regions are detected, the module 400 may automatically select and use the degenerate region repair module 418 to fix the degenerate region problem. In some implementations, depending on the potential risk from the repair for example, the module 400 may prompt the user to confirm certain repairs, and/or may allow the user to configure some parameters for the repair.

In some embodiments, modules for handling special cases may be present. For example, when meta table's only region is inconsistently assigned or deployed, an option for fixing meta assignments may be available. By way of another example, when HBase's version file is missing, an option for fabricating a new HBase version file may be available. A version file is required by HBase's data on the file system in order to start.

In one embodiment, the diagnostic module 402 may encounter a drastic corruption scenario, where the root table and/or meta table is corrupted and HBase cannot start. In such a situation, HBase diagnostics and repair tool 400 may include an offline meta repair tool that creates new root and/or meta tables. The module assumes that the HBase is offline and marches through the existing HBase home directory, loading as much information from region meta data files (.regioninfo files) as possible from the file system. If the region metadata has proper table integrity, it sidelines the original root and meta table directories, and builds new ones with pointers to the region directories and their data.

In one embodiment, once a region is split, the offline parent can be cleaned up automatically. However, sometimes, daughter regions are split again before their parents are cleaned up. HBase can clean up parents in the right order. However, there would be some lingering offline split parents sometimes. The offline split parents are in meta table, in HDFS and but may not be deployed, but HBase cannot clean them up. An offline split parent repair module can resent the split parents in meta table to be online and not split, and using other modules, can merge them with other regions if fixing overlapping regions option is used.

In one embodiment, the repair all module 442 can initiate, coordinate and/or repair all or most of the inconsistencies identified from the diagnostic scan of HBase. In one implementation, the repair all module 442 can coordinate and/or perform low risk repairs before performing high risk repairs. In a further implementation, user input or confirmation may be needed when performing certain high risk repairs.

In one embodiment, the scan of the HBase internals can be initiated by a command "hbck" that can be entered from the command line on a client. Along with the command "hbck" various flags can be specified for invoking various repair options described above with respect to the HBase diagnostic and repair tool. Table 1 below lists example flags and corresponding functions. It should be noted that one or more of the flags can be used together.

TABLE 1

| Command | Function |
| --- | --- |
| -details | Report more details including a representative listing of all the splits present in a table |

TABLE 1-continued

| Command | Function |
| --- | --- |
| -fixAssignments | Repairs unassigned, incorrectly assigned or multiply assigned regions |
| -fixMeta | Removes meta rows when corresponding regions are not present in HDFS and adds new meta rows if the regions are present in HDFS while not in meta table. |
| -fixAssignments -fixMeta -fixHdfsHoles | Repairs region holes by fabricating new empty regions on the file system. Used with -fixMeta and -fixAssignments to make the new region consistent. |
| -repairHoles | Repairs region holes by fabricating new empty regions on the file system and makes new region consistent (same as above) |
| -fixHdfsOrphans | Adopts a region directory that is missing a region metadata file. |
| -fixHdfsOverlaps | Repairs overlaps |
| -maxMerge <n> | Specifies a maximum number of overlapping regions to merge |
| -sidelineBigOverlaps | If more than maxMerge regions are overlapping, sidelines the regions overlapping with the most other regions. |
| -maxOverlapsToSideline <n> | If sidelining large overlapping regions, sidelines at most n regions. |
| -repair | Includes all the region consistency repair options and only the hole repairing table integrity options. |
| -fixMetaOnly -fixAssignments | If meta table's only region is inconsistently assigned or deployed, repairs meta assignments. |
| -fixVersionFile | Repair corrupted version file by fabricating a new HBase version file |
| -fixAll | Repairs all inconsistencies identified by the diagnostic scan. |

Figure 4B:
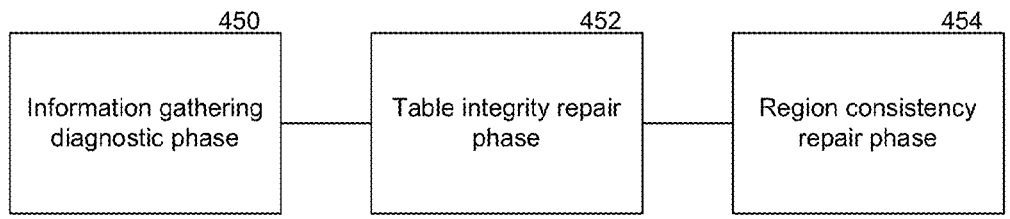
FIG. 4B depicts a diagram illustrating phases of detecting and repairing corrupted Hbases.

FIG. 4B depicts a diagram illustrating phases of detecting and repairing corrupted HBases. As depicted, at block 450, during an information gathering phase, information relating to the file system, meta table and region assignment can be obtained for diagnostic verifications such as table integrity verification and region consistency verification. At block 452, any inconsistencies that impact table integrity may be selected for repair. Following table integrity repair, region consistency repair phase may be initiated at block 454. During the region consistency repair phase, inconsistencies that impact the region consistency can be identified and fixed using one or more repair options discussed above. In another embodiment, a risk based approached may be used when performing repairs. For example, low risk repairs may be performed before high risk repairs. In one implementation, region consistency repairs, localized to a single region, and that modify in-memory data, ephemeral Zookeeper data, or patch holes in meta table may be considered low risk. In a further implementation, a second class of low risk repairs may include some table integrity repairs such as degenerate region repairs and backward region repairs may also be considered low risk repairs. In yet another implementation, a third class of low risk repairs include region hole repairs.

Figure 5:
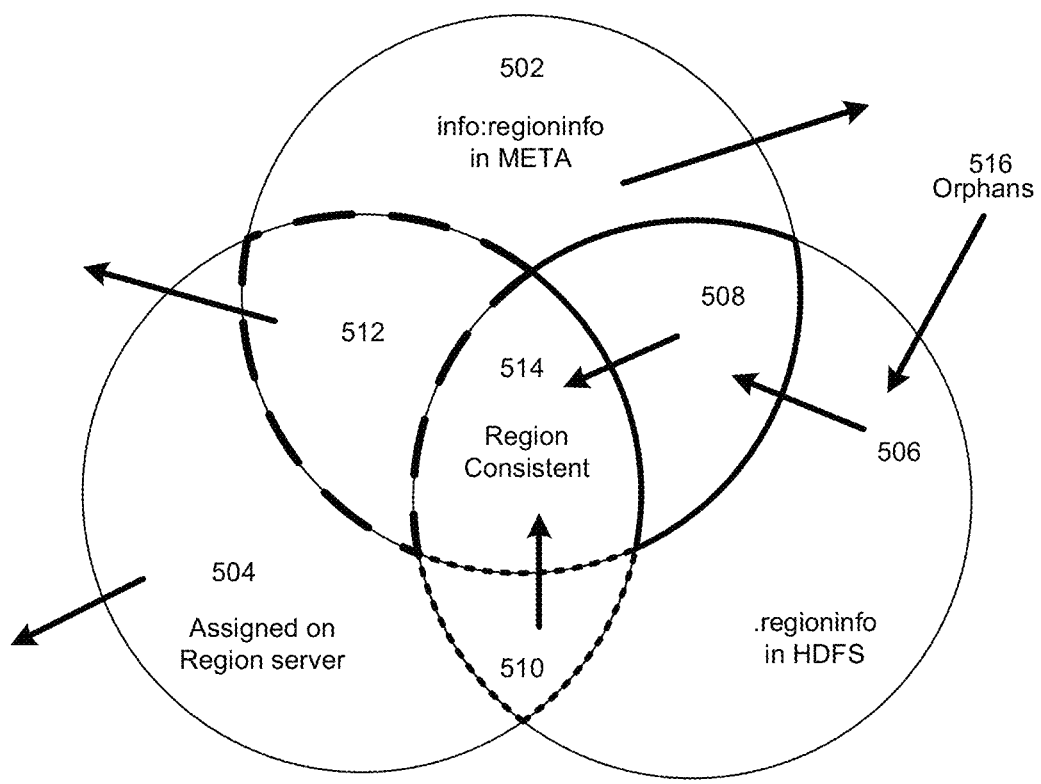
FIG. 5 depicts a diagram illustrating restoration of region consistency in HBase.

FIG. 5 depicts a diagram illustrating restoration of region consistency in HBase. As previously described, when repairing problems, the information in the file system is assumed to be the ground truth. Furthermore, consistency is restored when the states in HDFS 506, meta table 502 and region server 504 agree with each other. As depicted, the area 514 formed by the intersection of the three sources is the region consistent state, where data in file system is in agreement with region assignment on region server and region entry on meta table.

The area 508 depicts that there is data in HDFS 506 and a corresponding entry for the data in meta table 502.

However, the data in HDFS is not being served by the correct region server. There may no region server serving the data or more than one region server may be serving the data. This inconsistency is remedied by repairing the assignment problem, which allows HBase to transition from the inconsistent state into the region consistent state 514, as indicated by the arrow pointing from area 508 to area 514.

The area 510 depicts a state where there is data in HDFS and a correct region server is assigned to serve the data in HDFS, but the corresponding entry is missing in meta table, which prevents a client from determining which region server is serving the data. This problem of missing metadata is remedied by repairing the meta table and/or fixing the assignment to allow HBase to transition from an inconsistent state to the region consistent state as indicated by the arrow pointing from area 510 to area 514.

The area 512 depicts that the states in meta table and the region server agree with each other, but not with the HDFS. Since the information in the HDFS is taken as ground truth, and there is no corresponding state in HDFS, the information in the meta table and the region server are assumed to be incorrect and removed as indicated by the direction of the arrow.

Similarly, area 506 depicts that there is data in HDFS, but no corresponding entry in meta table or assignment in region server. In this instance, the data on the HDFS is made consistent by adding an entry in the meta table and assigning the region to the region server. This is indicated by the direction of arrows from area 506 to area 508 and then from area 508 to area 514. If, on the other hand, there is an entry in meta table but no HDFS data or assignment (area 502) or if there is assignment, but no entry in meta table or HDFS (604), the assignment and metadata are removed to restore the consistency as indicated by the arrows pointing away from area 502 and area 504.

Figure 6:
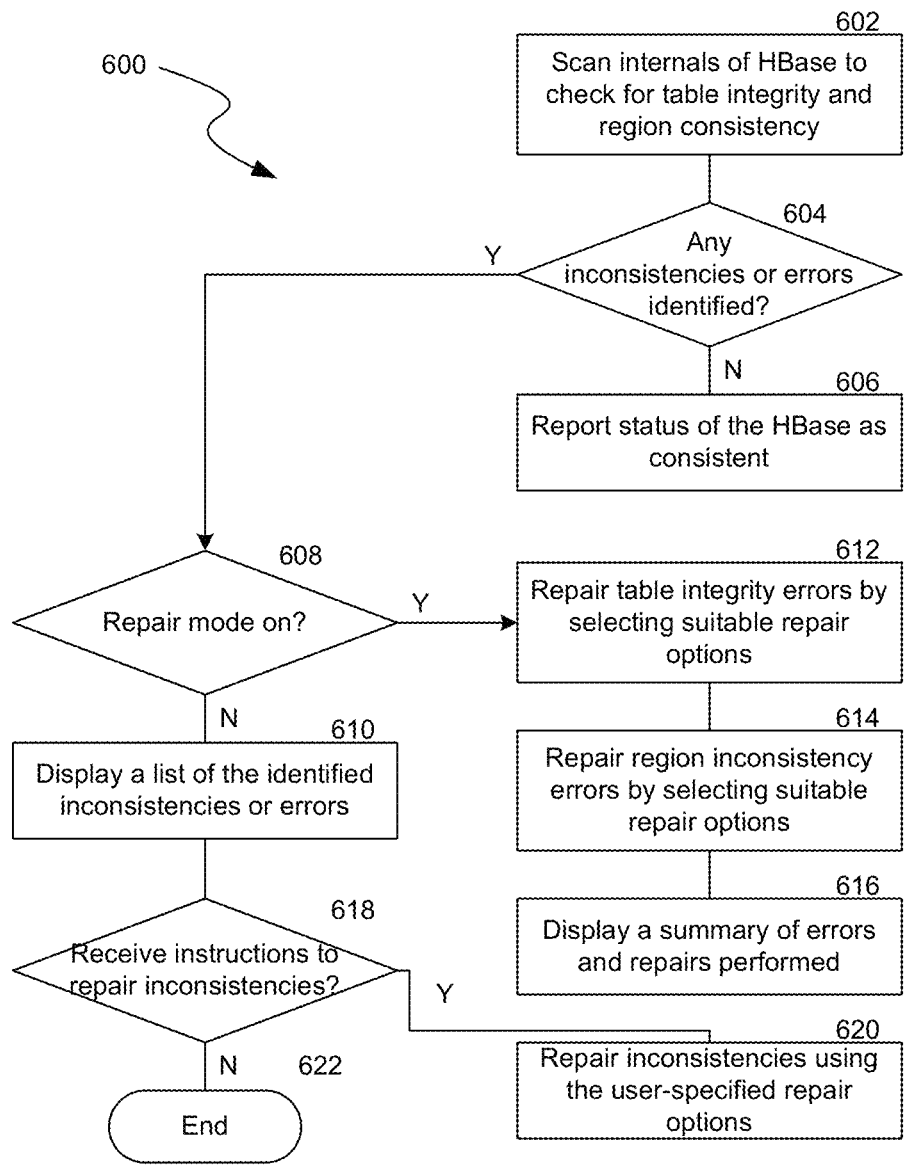
FIG. 6 depicts an example method of detecting and repairing corrupted HBases.

FIG. 6 depicts an example method 600 of detecting and repairing corrupted HBase. In one embodiment, a scan of the internals of HBase is performed at block 602 to check for problems concerning table integrity and region consistency. For example, a table's region directories can be scanned for ".regioninfo" files to verify the integrity of the table. The region consistency conditions can be verified by checking that each region has a valid .regioninfo file present in a region directory, valid row with .regioninfo data is present in meta table and is deployed only at the region server that it was assigned to.

At decision block 604, if the system does not detect any inconsistencies, that is the table integrity and region consistency conditions are met, the system reports the status of HBase as consistent at block 606. No further action may be necessary. Alternately, if the system detects one or more inconsistencies, the process moves to decision block 608. At decision block 608, the system determines if the repair mode is turned on. If the repair mode is not turned on, the system is in the diagnostic only mode and thus, generates and displays a report including a list of the detected inconsistencies or problems. An example report from a diagnostic run of the system is depicted in FIGS. 7A-B. The report lists all the inconsistencies detected, along with a brief description of the regions and tables affected, representative listing of all the splits present in all the tables, and the like. Alternately, if the repair mode is on, the system can automatically repair some or all of the inconsistencies detected. For example, in one implementation, the system can repair table integrity problems by selecting suitable repair options at block 612. For example, inconsistencies such as degenerate regions, backwards regions, presence of region holes, overlapping regions, and the like can be automatically repaired by the system. At block 614, the system may automatically repair the detected region inconsistency problems such as region assignment problems, incorrect meta rows, and the like. At block 616, the system may generate a report that lists the inconsistencies detected, the repairs, status of the repairs, and the like.

In one implementation, at decision block 618, if the user provides instructions to repair any of the detected inconsistencies, some or all of the inconsistencies that can be repaired using the user-specified repair options can be repaired at block 620. For example, the user instructions may include selection of a repair all option, which can cause the repair of all or at least some of the inconsistencies using various repair options described with respect to FIG. 4A. Some repair options may be too risky, in which case, the user may be requested to confirm the decision to proceed with the repair. Alternately, if the user does not provide any instructions, the process may end at block 622.

Figure 8:
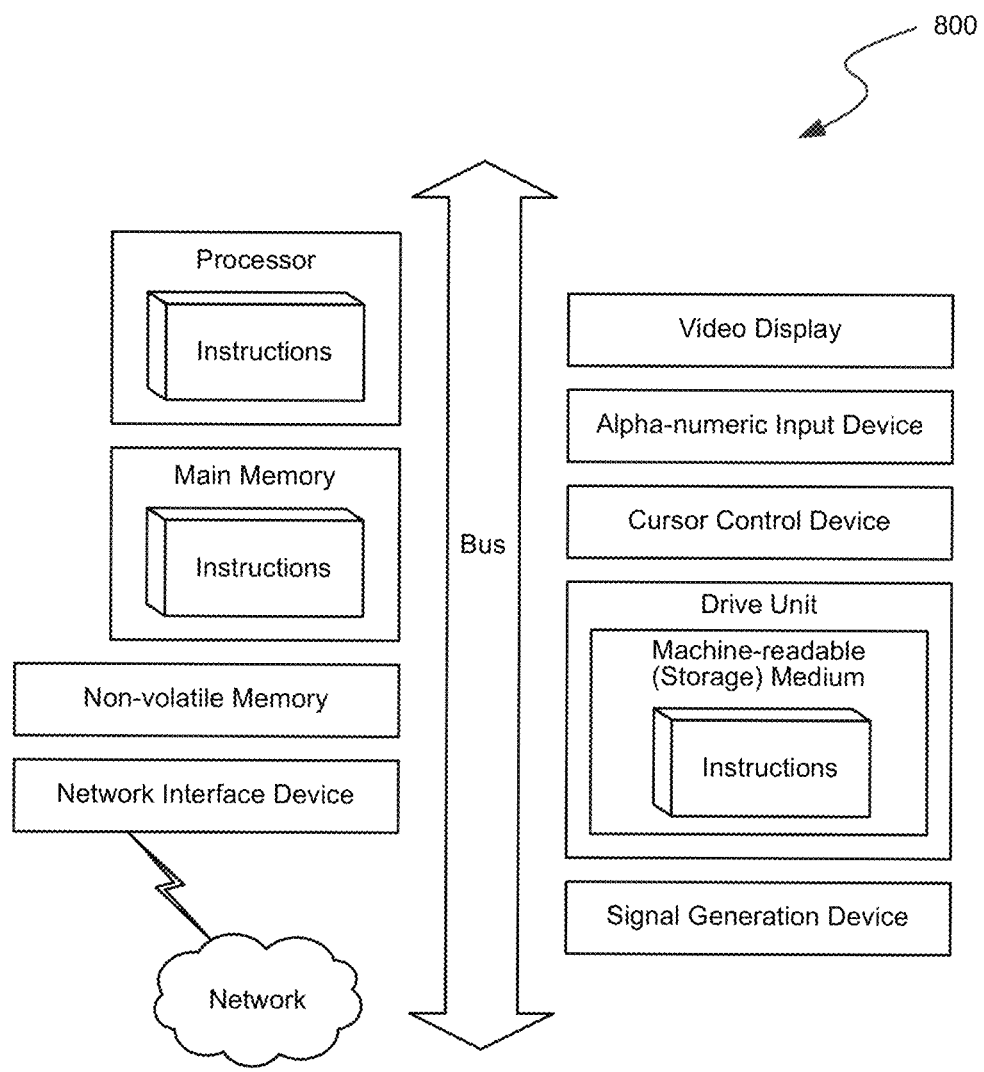
FIG. 8 depicts a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system within which a set of instructions, for causing the machine to perform any one or more of the methodologies discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIG. 4A (and any other components described in this specification) can be implemented. The computer system 800 can be of any applicable known or convenient type. The components of the computer system 800 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶113, other aspects may likewise be embodied as a means-plus-function claim, or in other forms, such as being embodied in a computer-readable medium. (Any claims intended to be treated under 35 U.S.C. §112, ¶113 will begin with the words "means for".) Accordingly, the applicant reserves the right to add additional claims after filing the application to pursue such additional claim forms for other aspects of the disclosure.

What is claimed is:

1. A method for maintaining table integrity of a datastore table in a distributed data cluster that relies on the datastore table for locating data, the datastore table having rows and being partitioned into regions, each region having a start key and a stop key for identifying which rows map to which region, the distributed data cluster including (1) a number of region servers, each region server maintaining one or more of the regions and (2) a distributed file system (DFS) that stores the data, the method comprising:
   identifying, by scanning all rows in the datastore table, whether each possible row in the datastore table maps to one and only one region;
   upon identifying that a particular row does not map to one and only one region, determining that a table integrity problem exists;
   determining a type of the table integrity problem;
   deciding a repair option based on the type of the table integrity problem, wherein the repair option is to cause the particular row to become mapped to one and only one correct region, in consistency with the data stored in the DFS; and
   resolving the table integrity problem by executing the repair option.

2. The method of claim 1, wherein the type of table integrity problem includes at least one of: a degenerate region, a backward region, a hole between regions, or a region overlap.

3. The method of claim 1, wherein the particular row maps to more than one region, and wherein the repair option includes:
   moving affected data to a temporary directory;
   modifying a start key or a stop key of a particular region associated with the table integrity problem such that the particular row becomes mapped to the one and only one correct region; and restoring the affected data from the temporary directory to the one and only one correct region.

4. The method of claim 3, wherein the type of the table integrity problem is a degenerate region, which includes a start key that equals a stop key.

5. The method of claim 3, wherein the type of the table integrity problem is a backward region, which includes a start key that is smaller than a stop key.

6. The method of claim 3, wherein the type of the table integrity problem is a region overlap which includes two regions having a same start key.

7. The method of claim 1, wherein the particular row maps to no region, and wherein the repair option includes:
fabricating a new region in the DFS;
updating a meta table to reflect the new region in the DFS; and
assigning the new region to a particular region server.

8. The method of claim 7, wherein the type of the table integrity problem is a hole between regions.

9. The method of claim 1, further comprising:
automatically performing said scanning of the datastore table, said determining of the type of table integrity problem, said deciding of the repair option, and said executing the repair option, based on a time schedule.

10. The method of claim 1, wherein the distributed data cluster implements a non-relational database management system.

11. The method of claim 1, wherein the datastore table is an Apache HBase™ table.

12. A method for maintaining region consistency in a distributed data cluster that relies on a datastore table for locating data, the datastore table having rows and being partitioned into regions, each region having a start key and a stop key for identifying which rows map to which region, the distributed data cluster including (1) a number of region servers, each region server maintaining one or more of the regions and (2) a distributed file system (DFS) that stores the data, the method comprising:
gathering information associated with the regions from locations including the region servers, the DFS, and a meta table that records which region server has a particular row for a particular access request,
identifying, based on the information associated with the regions, whether each available region is assigned to one and only one region server;
upon identifying that a particular region is not assigned to one and only one region server, or that any information associated with the regions from one location is inconsistent with such information from another location, determining that a region consistency problem exists;
determining a type of the region consistency problem;
deciding a repair option based on the type of the region consistency problem, wherein the repair option is to cause region information from the region servers and region information in the meta table to be consistent with the data stored in the DFS; and
resolving the region consistency problem by executing the repair option.

13. The method of claim 12, wherein the type of region consistency problem includes at least one of: assignment inconsistency in the region servers, no region information present in the DFS, no region information in the meta table, or an orphan region in the DFS.

14. The method of claim 13, wherein the assignment inconsistency includes at least one of: unassigned regions, incorrectly assigned regions, or multiply assigned regions.

15. The method of claim 12, wherein the type of region consistency problem is assignment inconsistency, and wherein the repair option includes:
examining region information on the DFS to determine, for a particular region associated with the assignment inconsistency problem, the one and only one correct region server to which the particular region should be assigned; and
modifying region information on region servers associated with the assignment inconsistency problem such that the particular region becomes assigned to the one and only one correct region server.

16. The method of claim 12, wherein the type of region consistency problem is no region information present in the DFS, and wherein the repair option includes:
removing region information of a particular region associated with the assignment inconsistency problem in the meta table; and
removing region information of the particular region associated with the assignment inconsistency problem in the region servers.

17. The method of claim 12, wherein the type of region consistency problem is no region information in the meta table, and wherein the repair option includes:
adding or updating region information of a particular region associated with the assignment inconsistency problem in the meta table.

18. The method of claim 12, wherein the type of region consistency problem is an orphan region in the DFS, and wherein the repair option includes:
upon detecting that a region in the DFS has no region information in the meta table and has no region server assignment, adopting the region into the data cluster by:
creating a corresponding entry for the region in the meta table; and
assigning the region to a region server.

19. The method of claim 12, wherein the distributed data cluster implements a non-relational database management system.

20. The method of claim 12, wherein the DFS is an Apache Hadoop™ Distributed File System.

21. A distributed database system having a datastore table for locating data, the datastore table having rows and being partitioned into regions, each region having a start key and a stop key for identifying which rows map to which region, the system comprising:
a number of region servers, each region server maintaining one or more of the regions;
a distributed file system (DFS) that stores the data; and
a master node configured to,
(A) in a first mode, perform:
identifying, by scanning all rows in the datastore table, whether each possible row in the datastore table maps to one and only one region;
upon identifying that a particular row does not map to one and only one region, determining that a table integrity problem exists;
determining a type of the table integrity problem;
deciding a repair option based on the type of the table integrity problem, wherein the repair option is to cause the particular row to become mapped to one and only one correct region, in consistency with the data stored in the DFS; and
resolving the table integrity problem by executing the repair option;

(B) in a second mode, perform:
- gathering information associated with the regions from locations including the region servers, the DFS, and a meta table that records which region server has a particular row for a particular access request,
- identifying, based on the information associated with the regions, whether each available region is assigned to one and only one region server;
- upon identifying that a particular region is not assigned to one and only one region server, or that any information associated with the regions from one location is inconsistent with such information from another location, determining that a region consistency problem exists;
- determining a type of the region consistency problem;
- deciding a repair option based on the type of the region consistency problem, wherein the repair option is to cause region information from the region servers and region information in the meta table to be consistent with the data stored in the DFS; and
- resolving the region consistency problem by executing the repair option.

\* \* \* \* \*

UNITED STATES PATENT AND TRADEMARK OFFICE
CERTIFICATE OF CORRECTION

PATENT NO. : 9,842,126 B2
APPLICATION NO. : 13/842967
DATED : December 12, 2017
INVENTOR(S) : Jonathan Ming-Cyn Hsieh It is certified that error appears in the above-identified patent and that said Letters Patent is hereby corrected as shown below:

On the Title Page

On the page 2, in Column 2, under "Other Publications", Line 19, delete "Applicaiton" and insert -- Application --, therefor.

In the Specification

In Column 14, Line 24, delete "¶113," and insert -- ¶ 6, --, therefor.

In Column 14, Line 27, delete "¶113" and insert -- ¶ 6 --, therefor.

Signed and Sealed this
Seventeenth Day of April, 2018

Andrei Iancu
*Director of the United States Patent and Trademark Office*